United States Patent Office 3,851,000
Patented Nov. 26, 1974

3,851,000
INCREASING POLYMER FUNCTIONALITY THROUGH METALLATION OF LOW MOLECULAR WEIGHT LIQUID POLYMERS WITH MENTHYLLITHIUM
Charles M. Selman and Henry L. Hsieh, Bartlesville, Okla., assignors to Phillips Petroleum Company
No Drawing. Filed July 12, 1973, Ser. No. 378,632
Int. Cl. C07f 1/02
U.S. Cl. 260—665 R                    9 Claims

ABSTRACT OF THE DISCLOSURE

Low molecular weight liquid polymers prepared by employing dilithio initiators are metallated with menthyllithium in the absence of a polar compound substantially without solidification. The functionality of the low molecular weight liquid polymer is increased substantially, thus improving curability.

FIELD OF THE INVENTION

The invention relates to a method to increase the functionality of low molecular weight liquid polymers. In another aspect, the invention relates to methods to improve the curability of low molecular weight liquid polymers.

BACKGROUND OF THE INVENTION

Low molecular weight, curable polymers have potential applications in such fields as rocket fuel binders, castable tires, and the like. However, these liquid polymers, while potentially useful, have been difficult to adequately cure since they lack adequate functionality, and thus the degree of cure generally has been insufficient to provide satisfactory properties in the cured polymer.

Lithiation, that is, contacting a polymer with an active organolithium lithiating compound to introduce lithium along the polymer chain or pendant groups, constitutes a theoretically simple, direct method to increase the functionality of the polymer. It is known to accomplish this with higher molecular weight rubbery polymers by the use of a variety of lithiating agents.

However, practical success with this method when employed on low molecular weight liquid conjugated diene polymers containing lithium end groups characteristically has been precluded due to the solidification of the metallation reaction mixture if substantial metallation occurs. This solidification of the cement of the polymer containing lithium end groups renders the metallated polymer effectively unavailable for conversion of the metallated sites to sites possessing useful, reactive groups such as the aforedescribed hydroxyl, carboxyl, and the like. Thus, in actual practice, such solidification precludes the curing or other ultimate objective for which metallation was undertaken.

OBJECTS OF THE INVENTION

It is an object of the invention to provide a readily curable polymer with a high degree of functionality. It is another object of the invention to increase the functionality of a low molecular weight liquid polymer. In a further aspect, it is an object of the invention to increase the number average functionality of low molecular weight liquid polymers. In a further aspect, the invention has as its object to increase the functionality and thus improve the curability of liquid polymers.

Other aspects, objects, and the several advantages of our invention will become further apparent to those skilled in the art or arts to which our invention most nearly appertains upon consideration of this our disclosure as presented in this specification including the appended claims.

SUMMARY OF THE INVENTION

We have discovered that the functionality of low molecular weight conjugated diene polymers can be substantially increased by metallation with menthyllithium and this can be effectuated in the absence of a polar compound.

We have discovered that low molecular weight liquid conjugated diene polymers can be treated by our invention to substantially increase their functionality, and thus improve curability.

Our invention provides a means to afford substantial, useful degrees of lithiation of low molecular weight liquid conjugated diene polymers and yet avoid solidification of the product mixtures obtained by the use of the lithiation procedures.

DETAILED DESCRIPTION OF THE INVENTION

Curability of liquid polymers is promoted by an increase in functionality, i.e., by increasing the number of reactive groups per polymer molecule. In accordance with our invention, the functionality of low molecular weight liquid conjugated diene polymers containing lithium end groups is substantially increased by metallation of the polymers with menthyllithium, without solidification of the mixtures resulting from the lithiation procedures.

The sites where metallation has been accomplished subsequently can be utilized in reactions through the introduction at these sites of one or more of a variety of functional groups such as hydroxyl, carboxyl, mercapto, aziridinyl, amino, or the like.

We accomplish our objectives by contacting a living dilithio conjugated diene polymer, what may be termed a polydienyllithium, with menthyllithium in the absence of a polar compound.

Conjugated diene polymers suitable for metallation in accordance with our invention include those derived from polymerizable conjugated dienes such as butadiene, isoprene, piperylene, or other polymerizable conjugated dienes of preferably 4 to 12 carbon atoms per molecule. The polymers include copolymers of two or more conjugated dienes, or copolymers of at least one conjugated diene with at least one monovinyl-substituted aromatic compound such as styrene, or other known copolymerizable monovinylaromatic compound, preferably those of 8 to 20 carbon atoms per molecule, all as are known to be polymerizable with conjugated dienes by lithium initiated polymerization systems.

The polymers which we employ are those prepared with a dilithio initiator, thus the linear polymer molecules normally contain lithium atoms at each end. Such polymers can further be characterized as exhibiting a liquid condition above about 15–20° C. The liquid, conjugated diene polydienyllithium polymer suitable for this invention can contain units derived from nondiene monomers, e.g., styrene, provided that such groups do not contain reactive features which inactive the menthyllithium metallating compound employed in accordance with our invention as the active metallating agent.

The menthyllithium metallating agents can be described by the formula:

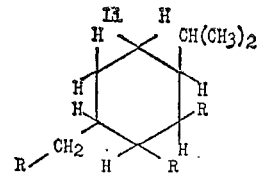

wherein R is hydrogen, or is methyl, ethyl, n-propyl, or isopropyl, such that the total number of carbon atoms in the sum of the R groups does not exceed about 9. Examples of such menthyllithium-type compounds include 2-isopropyl-5-methylcyclohexyllithium (menthyllithium),
2-isopropyl-5-ethylcyclohexyllithium,
2-isopropyl-3-ethyl-5-methylcyclohexyllithium,
2-isopropyl-3-ethyl-4-methyl-5-ethylcyclohexyllithium,
2-isopropyl-3-(n-propyl)-4-(n-propyl)-5-butylcyclohexyllithium, and the like, alone, or in admixture.

The metallation reaction according to the process of our invention can be carried out in the presence of a diluent, if desired, and such is certainly a convenience. Suitable diluents include hydrocarbons not detrimental to the metallization or lithiating process, and include cyclohexane, methylcyclopentane, benzene, n-hexane, n-heptane, 2,2,4-trimethylpentane, and other paraffinic and aromatic hydrocarbons.

Metallation can be accomplished over a broad range of temperatures, with the reaction times dependent upon the temperature employed which controls to some extent the reactivity of the chemical reaction. Exemplary metallation temperatures range from such as about 15° F. to about 220° F., presently preferably between 70° F. and 160° F.

The polymerization process itself is a conventional polymerization process employing polymerization conditions of temperatures, pressures, as are known to the polymerization arts, and preferably employing a solution process in a hydrocarbon solvent, paraffin or aromatic, as described for the metallation process. The requirement according to the process of our invention is that the polymerization process has been initiated and conducted with a dilithio initiator.

The dilithio initiators include such as 1,4-dilithobutane, 1,4-dilithio-2-methylbutane, 1,4-dilithionaphthalene, 1,2-dilithio-1,2-diphenylethane, and the like, including those represented by $RLi_2$ wherein R is a divalent hydrocarbon radical, and preferably is of up to 20 carbon atoms per R radical, more preferably of aliphatic type.

The polymerization process should be conducted in the absence of a polar compound.

At the conclusion of the polymerization reaction, the living dilithio polymer, more often termed a polydienyllithium, is treated unquenched, i.e., before addition of any agent which would tend to inactivate the polymer-lithium entity. The metallating agent, as we have described above, preferably is added to the cement of the living polymer in an amount sufficient to provide about 0.5 to 175, more preferably about 30 to 90, gram millimoles of metallating agent per hundred grams of dilithio polymer, though these ranges can vary somewhat, depending on extent of metallating and hence of functionality desired.

At the conclusion of the metallation reaction, the thus-metallated polymer then can be treated with a reagent suitable to introduce the desired functional groups at the sites of metallation. For example, alkene oxides can be utilized to introduce hydroxy groups at the sites of metallation; carbon dioxide can be used to introduce carboxy groups. Sulfur can be utilized to introduce mercapto groups, and so on, as are well known in the art. After conversion of the polymer from metallated form to the derivative form containing the desired functional group, the functional polymer can be isolated by neutralization such as with aqueous mineral acid followed by water washing, dilution with an alcohol such as isopropyl alcohol, including, if desired, addition of an antioxidant, followed by removal of volatile from the organic phase under reduced pressure to isolate the functional polymers.

EXAMPLES

Examples are intended to assist an understanding of our invention without intending to limit the invention. Particular materials employed, species, ratios, are intended to be illustrative and not limitative of the reasonable scope of our invention.

EXAMPLE I

Polybutadienes were synthesized in closed reactors under a nitrogen atmosphere tumbled in a constant temperature bath in accordance with the following recipe:

RECIPE

| | |
|---|---|
| Cyclohexane | 580 Phm. [a] |
| 1,3-butadiene | 100 parts. |
| Catalyst, LIMI-B [c] (runs 1-4), DiLi-3 [d] (runs 5-8) | 30 mhm. [b] |
| Polymerization temperature | 122° F. |
| Polymerization time | 35 min. with LIMI-B, 50 min. with DiLi-3. |

[a] Parts per 100 parts monomer.
[b] Gram millimoles per 100 grams of monomer.
[c] A dilithium initiator prepared in accordance with U.S. 3,287,333, Example I.
[d] A commercial dilithium initiator. Refer DiLi Product Bulletin Difunctional Lithium Catalysts, Bulletin 192, Lithium Corp. of America, Bessemer City, N. C. 28016.

The polymer solutions prepared above then were subjected to metallation reactions at 122° F. for 8 hours using various metallating agents. Results are as shown in the following table:

TABLE I

| Run | Polymerization catalyst | Metallating compound Type | M.h.m. | Resulting product mixture |
|---|---|---|---|---|
| 1 | LIMI-B | None | 0 | Remained fluid. |
| 2 | LIMI-B | Menthyllithium [a] | 19 | Do. |
| 3 | LIMI-B | sec-Butyllithium | 19 | Became firmly jelled within one hour. |
| 4 | LIMI-B | n-Butyllithium | 19 | Remained fluid. |
| 5 | DiLi-3 | None | 0 | Do. |
| 6 | DiLi-3 | Menthyllithium | 17 | Remained fluid but quite viscous. |
| 7 | DiLi-3 | sec-Butyllithium | 19 | Became firmly gelled within one hour. |
| 8 | DiLi-3 | n-Butyllithium | 19 | Remained fluid but quite viscous. |

[a] Prepared by the method of Glaze, W. H., and Selman, C. M., 33 J. Org. Chem., 1987-1990 (1968).

In view of the firmly gelled or essentially solidified nature of the product mixtures of runs 3 and 7 above, these were set aside and not utilized further. The other metallation product mixtures each were agitated with tetrahydrofuran 5.5 phm. and propylene oxide 43 phm. for 16 hours at 122° F.

The hydroxylation product mixtures so resulting from this further treatment of Runs 1, 2, 4, 5, 6, and 8, then were acidified with aqueous hydrochloric acid, water washed to neutrality, diluted with isopropyl alcohol, 1 phm. 2,2′-methylene-bis(4-methyl-6-t-butylphenol) was added as antioxidant, and volatiles from the organic phase were moved under reduced pressure to recover and isolate the polymers. Properties of the so-prepared hydroxylated polymers are shown below in Table II:

TABLE II

| Run number | Hydroxyl, wt. percent [a] | Viscosity [b] at 25.6° C., poises | $M_w$ [c] $\times 10^{-3}$ | $M_n$ [c] $\times 10^{-3}$ | Heterogeneity index |
|---|---|---|---|---|---|
| 1 | 0.87 | 40 | 4.4 | 3.5 | 1.26 |
| 2 | 1.43 | 34 | 4.4 | 3.6 | 1.24 |
| 4 | 0.95 | 40 | 4.4 | 3.5 | 1.26 |
| 5 | 0.64 | | 7.2 | 5.5 | 1.31 |
| 6 | 1.36 | | 7.1 | 5.5 | 1.30 |
| 8 | 1.03 | | 7.2 | 5.5 | 1.31 |

[a] Method of Fritz, J. S., and Schenk, G. H., 31 Anal. Chem., 1808-1812 (1959).
[b] Determined on a Brookfield viscometer, Model RVF, No. 7 Spindle, 77° F. constant temperature.
[c] Number average molecular weight and weight average molecular weight, respectively, determined by gel permeation chromatography in accordance with the method of Kraus, G., and Stacy, C. J., 10 J. Poly. Sci. A-2, 657 (1972).

The superiority of menthyllithium over n-butyllithium with regard to the degree of metallation, as reflected in Table II as percent of hydroxyl, is seen by comparing Run 2 with Run 4, and Run 6 versus Run 8. Runs 3 and 7 were not possible to so treat, since hydroxylation simply was impractical due to the problem of solidification of the metallation product mixtures in those runs employing sec-butyllithium as metallating agent. Thus, menthyllithium is clearly superior, unexpectedly so, relative to alkyllithiums including either n-butyllithium or sec-butyllithium as metallating agent.

EXAMPLE II

A further series of polymerization-metallation-hydroxylation runs were made as described above for Example I. The recipes and results are shown below:

RECIPE

| | |
|---|---:|
| Polymerization: | |
| Cyclohexane, phm | 825 |
| 1,3-butadiene, phm | 100 |
| DiLi-3, mhm | 30 |
| Temperature, °F | 122 |
| Time, hrs | 1 |
| Metallation: | |
| Metallating agent | Variable |
| Tetrahydrofuran | Do |
| Temperature, °F | 122 |
| Time, hrs | Variable |
| Hydroxylation: | |
| Tetrahydrofuran, phm | 11 |
| Propylene oxide, phm | 2.75 |
| Temperature, °F | 122 |
| Time, hrs | 16 |

The polymer isolation technique was as described in Example I above, except that 0.5 phm. 2,6-di-t-butyl-4-methylphenol was employed as antioxidant.

Results obtained are as follows, as shown below in Table III:

TABLE III

| | Metallation reaction | | | | Hydroxylated product | |
|---|---|---|---|---|---|---|
| Run No. | Agent | Mhm. | Tetra-hydro-furan, phm. | Hrs. | Viscosity at 25.6° C., poises | Hydroxyl, wt. percent |
| 9 | None | | | | 78 | 0.74 |
| 10 | Menthyllithium | 46 | 0 | 8 | 54 | 1.43 |
| 11 | sec-C₄H₉Li | 50 | 0 | 8 | 120 | 1.49 |
| 12 | n-C₄H₉Li | 50 | 0 | 8 | 68 | 1.15 |
| 13 | sec-C₄H₉Li | 50 | *1.5+11 | 4 | | |
| 14 | n-C₄H₉Li | 50 | *1.5+11 | 4 | 72 | 0.80 |

*The additional 11 parts were added after 1 hour.

The metallation product mixture of Run 13 solidified within the first hour of reaction. It did not fluidize upon addition of the additional tetrahydrofuran as shown above in Table III. Negligible reaction with propylene oxide occurred in Run 13 because of the intractable nature of the metallation product mixture.

The metallation product mixture of Run 11 similarly solidified and did not fluidize upon addition of additional tetrahydrofuran. However, this product mixture was subjected to very strenuous agitation and thus was finally converted to a finely divided state capable of limited reaction with propylene oxide and hydroxylation. However, this method plainly is disadvantageous, and is impractical commercially, in contrast to the alternative use of menthyllithium according to the process of our invention wherein solidification does not occur.

Run 10 above reflects the process of our invention, demonstrating effective metallation, easily, conveniently.

By the use of comparatively less reactive metallating agents, such as n-butyllithium, for the metallation of metal-terminated polymers, relatively little metallation occurs at reaction intervals of conventional duration. The alternative use of more reactive metallating agents known to the art such as sec-butyllithium can afford satisfactory metallation yields within practical time limits—but frequently practical use of such so-metallated polymers through further reaction at the sites of metallation is precluded by the solidification of the metallation product mixture so obtained. Employment of practical amounts of a polar compound such as an ether or amine does not prevent this solidification.

Unexpectedly, menthyllithium affords both a relatively high degree of metallation and avoidance of the undesirable and commercially impractical solidification of the living cement. And, menthyllithium is effective in the absence of polar compounds otherwise recommended for metallation reactions, such as by U.S. 3,492,369 to facilitate the operation of the organolithium metallating agent.

The functional polymers of our invention can be utilized in a variety of applications, and can be cured to semisolid to solid materials by a variety of curing methods known to the polymer arts.

Liquid polymers find potential application in processes for curing-in-place as desired. Liquid polymers with proper functionality are employable in a variety of end uses including flexible moldings, castable tires, rocket fuel binders, pipe and tank coatings, rollers and solid wheels, and the like. Liquid polymers also find usefulness in adhesive and sealant applications.

The disclosure and data have shown the value and effectiveness of our invention. Reasonable variations and modifications certainly are possible within the scope of our disclosure, yet without departing from the reasonable scope and spirit thereof to which we are entitled.

We claim:

1. A process of lithiating liquid conjugated diene polymers which comprises treating said liquid conjugated diene polymer as polydienyllithium with a menthyllithium under metallation conditions.

2. The metallation process according to claim 1 wherein said menthyllithium can be represented by

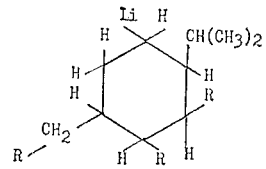

wherein R is hydrogen or is an alkyl group and is methyl, ethyl, n-propyl, or isopropyl, such that the total number of carbon atoms in the sum of the R groups does not exceed 9.

3. The metallation process according to claim 2 wherein said menthyllithium is 2-isopropyl-5-methylcyclohexyllithium (menthyllithium),
2-isopropyl-5-ethylcyclohexyllithium,
2-isopropyl-3-ethyl-5-methylcyclohexyllithium,
2-isopropyl-3-ethyl-4-methyl-5-ethylcyclohexyllithium,
2-isopropyl-3-(n-propyl)-4-(n-propyl)-5-t-butylcyclo-
  hexyllithium and the like.

4. The metallation process according to claim 1 wherein said metallation is conducted in the presence of a hydrocarbon diluent.

5. The metallation process according to claim 2 wherein said metallation conditions include a metallation temperature of about 15° F. to 220° F. utilizing a pressure sufficient to maintain the reactants substantially in the liquid phase.

6. The metallation process according to claim 1 wherein said conjugated diene polymer is a polymer of at least one polymerizable conjugated diene, copolymer of two or more such conjugated dienes, copolymer of at least one such conjugated diene with at least one copolymerizable monovinyl-substituted aromatic hydrocarbon.

7. The process according to claim 1 wherein said metallation is conducted in the absence of a polar compound.

8. A polymerization process which comprises polymerizing at least one polymerizable conjugated diene, or at least one polymerizable conjugated diene with at least one copolymerizable monovinyl-substituted aromatic compound, under polymerization conditions, with a dilithium initiator, in the presence of an inert hydrocarbon solvent, thereby producing a conjugated dienyllithium polymer, and thereafter metallating said polydienyllithium with a menthyllithium under metallation conditions, wherein said menthyllithium can be represented by the formula

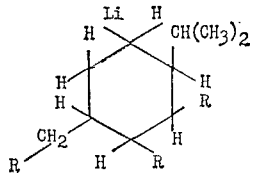

wherein R represents hydrogen or an alkyl group such that the total number of carbon atoms in the sum of R groups does not exceed 9.

9. The process according to claim 8 wherein said metallation is conducted in the presence of a hydrocarbon diluent, in the absence of a polar compound, and said metallation conditions include a temperature in the range of about 15° F. to 220° F., and a pressure sufficient to maintain the reactants substantially in the liquid phase.

References Cited
UNITED STATES PATENTS

| 3,492,369 | 1/1970 | Naylor | 260—879 |
| 3,725,488 | 4/1973 | Hsieh | 260—665 R |
| 3,734,972 | 5/1973 | Naylor et al. | 260—665 R |
| 3,734,973 | 5/1973 | Farrar | 260—665 R |
| 3,776,964 | 12/1973 | Morrison et al. | 260—665 R |
| 3,780,045 | 12/1973 | Screttas | 260—665 R |

OTHER REFERENCES

Glaze et al.: J. Am. Chem. Soc., 91 (1969), pp. 7198–9.

PATRICK D. GARVIN, Primary Examiner
A. P. DEMERS, Assistant Examiner

U.S. Cl. X.R.

252—431 L; 260—942 M, 526, 607, 614